(12) United States Patent
Zheng et al.

(10) Patent No.: US 10,398,149 B2
(45) Date of Patent: Sep. 3, 2019

(54) FLOUR PRODUCT WHITENER CONTAINING POLYSACCHARIDE ALCOHOL AND USE THEREOF

(71) Applicant: Wilmar (Shanghai) Biotechnology Research & Development Center Co., LTD, Shanghai (CN)

(72) Inventors: Yan Zheng, Shanghai (CN); Ruihua Guo, Shanghai (CN); Tiankui Yang, Shanghai (CN); Xuebing Xu, Shanghai (CN)

(73) Assignee: WILMAR (SHANGHAI) BIOTECHNOLOGY RESEARCH & DEVELOPMENT CENTER CO., LTD, Shanghai (CN)

(*) Notice: Subject to any disclaimer, the term of this patent is extended or adjusted under 35 U.S.C. 154(b) by 55 days.

(21) Appl. No.: 14/428,284

(22) PCT Filed: Sep. 10, 2013

(86) PCT No.: PCT/CN2013/083173
§ 371 (c)(1),
(2) Date: Mar. 13, 2015

(87) PCT Pub. No.: WO2014/040519
PCT Pub. Date: Mar. 20, 2014

(65) Prior Publication Data
US 2015/0250218 A1    Sep. 10, 2015

(30) Foreign Application Priority Data
Sep. 14, 2012  (CN) ......................... 2012 1 0342676

(51) Int. Cl.
| | | |
|---|---|---|
| *A21D 8/04* | (2006.01) | |
| *A21D 2/18* | (2006.01) | |
| *A21D 6/00* | (2006.01) | |
| *A21D 2/14* | (2006.01) | |
| *A21D 10/00* | (2006.01) | |
| *A23L 7/10* | (2016.01) | |
| *A23L 7/109* | (2016.01) | |
| *A23L 5/49* | (2016.01) | |

(52) U.S. Cl.
CPC .............. *A21D 8/047* (2013.01); *A21D 2/14* (2013.01); *A21D 2/181* (2013.01); *A21D 6/00* (2013.01); *A21D 6/001* (2013.01); *A21D 8/045* (2013.01); *A21D 10/005* (2013.01); *A23L 5/49* (2016.08); *A23L 7/109* (2016.08); *A23L 7/198* (2016.08); *A23V 2002/00* (2013.01)

(58) Field of Classification Search
CPC ........................................................ A23L 5/49
See application file for complete search history.

(56) References Cited

U.S. PATENT DOCUMENTS

| | | | | | |
|---|---|---|---|---|---|
| 2,785,978 | A | * | 3/1957 | Willebrord ............. | A23G 1/305 426/611 |
| 5,059,432 | A | * | 10/1991 | Berkowitz ............... | A21D 2/14 426/19 |
| 2003/0017132 | A1 | | 1/2003 | Li et al. | |
| 2005/0153015 | A1 | * | 7/2005 | Inoue ........................ | A21D 2/18 426/18 |
| 2006/0177545 | A1 | * | 8/2006 | Haynes ................... | A23L 25/25 426/103 |
| 2006/0286204 | A1 | * | 12/2006 | Arai ...................... | A23G 3/0063 426/5 |

FOREIGN PATENT DOCUMENTS

| | | |
|---|---|---|
| CN | 1526287 A | 9/2004 |
| CN | 1638644 A | 7/2005 |
| CN | 102599207 A | 7/2012 |
| CN | 103053879 A | 4/2013 |
| EP | 1264853 A2 | 12/2002 |
| JP | S5129259 A | 3/1976 |
| JP | S6413956 A | 1/1989 |
| JP | H03117459 A | 5/1991 |
| JP | 2003055452 A | 2/2003 |
| JP | 2007153817 A | 6/2007 |
| WO | 03039261 A1 | 5/2003 |

OTHER PUBLICATIONS

QP Corp JP 53148558 Derwent Abstract 1 page.*
Lewis et al. "Sugar Alcohols (Polyols) in Fungi and Green Plants" 1967 New Phytologist vol. 66 Issue 2 pp. 143-184.*
Aust et al. (DD 207070) Derwent abstract Feb. 15, 1984 1 page.*
Kaku et al. (JP 2003-55452) Feb. 26, 2003 Translation. (Year: 2003).*
Hee-Jung, et al. "Biotechnological production of erythritol and its applications", Appl Microbiol Biotechnol, 2010, vol. 86: pp. 1017-1025.
International Search Report Application No. PCT/CN2013/083173 Completed: Dec. 8, 2013; dated Dec. 19, 2013
You, Xin. Science and Technology of Cereals, Oils and Foods, vol. 18, No. 6, pp. 14-17.
B.Tong, et al. "Thermodynamic Investigation of Several Natural Polyols Part III. Heat capacities and thermodynamic properties of erythritol", Journal of Thermal Analysis and Calorimetry, 2009, vol. 95: pp. 469-475.
Inoue, et al., "Edible composition used as foodstuffs, contains thioctic acid and lipid component having specific fatty acid unit", Mar. 26, 2013, 3 pages.
European Search Report Application No. EP 13 83 6893 dated May 15, 2016 7 pages.
Notification of Reasons for Refusal Application No. 2015-531445 (JP) dated Mar. 9, 2016 4 pages.

* cited by examiner

*Primary Examiner* — Felicia C Turner
(74) *Attorney, Agent, or Firm* — Fish & Richardson P.C.

(57) ABSTRACT

A flour product whitener containing polysaccharide alcohol. When the flour product whitener is used in a flour product, the amount of the polysaccharide alcohol is 0.01-10 parts by mass in every 100 parts by mass of total flour in the flour product.

17 Claims, No Drawings

FLOUR PRODUCT WHITENER CONTAINING POLYSACCHARIDE ALCOHOL AND USE THEREOF

TECHNICAL FIELD

The invention relates to the field of food additives, more particularly to a polysaccharide alcohol-containing whitener for flour products and use of the same. The invention also relates to a flour product comprising a polysaccharide alcohol.

BACKGROUND ART

Flour products made from flour obtained by grinding cereals such as wheat, barley, oat, rice, glutinous rice, etc. are used as daily staple food by an overwhelming majority of the people around the world. These flour products mostly have white color. People usually relate bright color with the quality and freshness of the flour product. However, the appearance of a flour product may be affected badly during storage and handling due to enzyme browning or non-enzyme browning such as Maillard reaction and the like which darken the color of the flour product. To solve this problem, a chemically synthesized oxidant is generally added into the flour product for whitening. Benzoyl peroxide is one of such chemically synthesized oxidants, which whitens flour by oxidizing carotenoid in the flour that makes the flour slightly yellow, and had been widely used as an effective flour whitener for a long time. Nevertheless, it has been discovered that benzoyl peroxide has some risk of carcinogenesis. In addition, it may add to hepatic burden, leading to pathological change of liver and kidney, as well as various diseases such as atherosclerosis. As such, the Ministry of Health of PRC issued a pronunciamento that forbade production of benzoyl peroxide and calcium peroxide as food additives and addition thereof into flour, and banned food additive plants from manufacturing and selling benzoyl peroxide as a food additive. Therefore, it is desirable to obtain an alternative whitener which has good whitening effect without any toxic side-effect.

Saccharide alcohol is a polyol having two or more hydroxyl groups. In contrast to petrochemically synthesized polyols such as ethylene glycol, propylene glycol, pentaerythritol and the like, the saccharide alcohol is derived from an annually renewable saccharide in nature as raw material. Hence, it is inexhaustible and inexpensive. A saccharide alcohol is formed by reducing the aldehyde or ketone group on a saccharide molecule into hydroxyl group. For example, glucose may be reduced to sorbitol; xylose to xylitol; maltose to maltitol, fructose to mannitol, etc. Although saccharide alcohols are not saccharides, they exhibit some attributes of saccharides because they are mostly prepared by reducing saccharides via hydrogenation. Saccharide alcohols are safe foods with no limited edible amount as approved by both CAC and JECFA, two international food and health organizations. Since saccharide alcohols do not decay teeth or increase blood sugar, and provide certain calories for diabetes patients, they may be used widely in place of sugars as nutrient sweeteners in sugar free foods. Saccharide alcohols under worldwide mass production currently include sorbitol, maltitol, xylitol, erythritol, mannitol, lactitol, isomaltitol, etc., among which erythritol is an important representative. Erythritol, also named erythrose alcohol and bearing the structure shown by formula (1), is a polyol sweetener. It exists naturally in algae, mushrooms, melons, grapes and fermented foods, and is also found in human eye balls and blood serum. It is quite suitable for use as a substitute sweetener for diabetes patients, because it cannot be degraded by enzyme after ingested; instead, it can only be transferred from blood through kidney to urea from which it is discharged, and it does not take part in sugar metabolism or contribute to the variation of blood sugar. Additionally, erythritol will not ferment in colon, and thus will not cause gastro-intestinal discomfort. Moreover, as a low calorie sweetener, it will not decay teeth. Owing to the above advantages, erythritol is widely used in various foods.

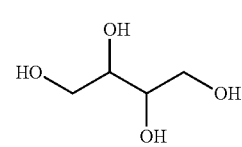

Formula (1)

Erythritol may undergo polymerization to produce polyerythriol. The polyerythritol is a golden sticky liquid which has excellent low temperature softness, high stability under acidic, alkaline and high temperature conditions, low volatility, and high adhesive ability.

Hee-Jung, et al. (Appl Microbiol Biotechnol, 2010, vol. 86: pp. 1017-1025) and B. Tong et al. (Journal of Thermal Analysis and calorimetry, 2009, vol. 95: pp. 469-475) have studied the production, properties, thermodynamic behaviors and application of erythritol. It is mentioned in Patent Application US2003/0017132 that erythritol polymers and aliphatic acid esters or aliphatic ethers thereof may be used as surfactants, emulsifiers, cosmetic raw materials, detergents, defoamers, dispersants, solubilizers, preservatives, etc. Their combinations or raw materials are also mentioned. However, the use of a polysaccharide alcohol as a whitener in a flour product has not been disclosed up to date. Particularly, there is no mention of polyerythritol for such use.

SUMMARY

Therefore, the first object of the invention is to provide a whitener for a flour product.

The flour product whitener provided according to the invention comprises a polysaccharide alcohol, wherein when the flour product whitener is used in the flour product, the content of the polysaccharide alcohol is preferably 0.01-10 parts by mass, more preferably 0.5-5 parts by mass, still more preferably 0.5-2 parts by mass based on 100 parts by mass of the flour in the flour product.

In a preferred embodiment of the invention, the polymerization degree of the polysaccharide alcohol is 2-10, preferably 2-8, more preferably 2-6.

In a preferred embodiment of the invention, the polysaccharide alcohol comprises:
  A) a polymer formed from a monomer selected from the group consisting of sorbitol, mannitol, erythritol, maltitol, lactitol, xylitol, hydrogenated starch sugar alcohol, isomaltitol, D-mannitol or combinations thereof; preferably a polymer formed from a monomer selected from the group consisting of erythritol, xylitol, sorbitol or combinations thereof; and/or
  B) one or more of polysorbitol, polymannitol, polyerythritol, polymaltitol, polylactitol, polyxylitol, poly(hydrogenated starch sugar alcohol), polyisomaltitol, poly(D-mannitol); preferably one or more of polyerythritol, polyxylitol, polysorbitol.

In a preferred embodiment of the invention, based on the mass of the polysaccharide alcohol, the proportion of the polymeric unit derived from one kind of saccharide alcohol monomer in the polysaccharide alcohol is greater than 80 mass %, preferably greater than 85 mass %, preferably greater than 90 mass %, more preferably greater than 95 mass %, more preferably greater than 99 mass %.

Another object of the invention is to provide a use of a polysaccharide alcohol as a whitener for a flour product.

The invention provides a use of a polysaccharide alcohol as a whitener for a flour product.

In an embodiment, when the polysaccharide alcohol is used in a flour product, based on 100 parts by mass of the flour in the flour product, the content of the polysaccharide alcohol is 0.01-10 parts by mass, preferably 0.5-5 parts by mass, and more preferably 0.5-2 parts by mass.

In a preferred embodiment of the invention, the polymerization degree of the polysaccharide alcohol is 2-10, preferably 2-8, more preferably 2-6.

In another preferred embodiment of the invention, the polysaccharide alcohol comprises:
A) a polymer formed from a monomer selected from the group consisting of sorbitol, mannitol, erythritol, maltitol, lactitol, xylitol, hydrogenated starch sugar alcohol, isomaltitol, D-mannitol or combinations thereof; preferably a polymer formed from a monomer selected from the group consisting of erythritol, xylitol, sorbitol or combinations thereof; and/or
B) one or more of polysorbitol, polymannitol, polyerythritol, polymaltitol, polylactitol, polyxylitol, poly(hydrogenated starch sugar alcohol), polyisomaltitol, poly(D-mannitol); preferably one or more of polyerythritol, polyxylitol, polysorbitol.

In a more preferred embodiment of the invention, based on the mass of the polysaccharide alcohol, the proportion of the polymeric unit derived from one kind of saccharide alcohol monomer in the polysaccharide alcohol is greater than 80 mass %, preferably greater than 85 mass %, preferably greater than 90 mass %, more preferably greater than 95 mass %, more preferably greater than 99 mass %.

In another preferred embodiment of the invention, the flour product further comprises:
one or more optional ingredients selected from the group consisting of water, foamers, fermentation agents, acidity regulators, anti-caking agents, defoamers, antioxidants, leavening agents, color fixatives, flavoring agents, nutrition enhancers, preservatives, sweeteners, thickeners, flavors, adhesives; and optional whiteners other than polysaccharide alcohols.

In another preferred embodiment of the invention, the flour in the flour product is selected from the group consisting of wheat flour, rice flour, glutinous rice flour or combinations thereof.

In another preferred embodiment of the invention, the flour product is selected from the group consisting of doughs, noodles, steamed buns, bread, pastries, cookies, steamed buns with stuffing, dumplings, sweet dumplings, soup with flour, sculptures with flour, molds with flour, paintings with flour.

Using a polysaccharide alcohol polymer as a flour product whitener, the invention achieves whitening effect similar to that produced by benzoyl peroxide commonly used in the prior art.

Still another object of the invention is to provide a flour product comprising a polysaccharide alcohol.

In the flour product comprising a polysaccharide alcohol provided according to the invention, based on 100 parts by mass of the flour in the flour product, the content of the polysaccharide alcohol is 0.01-10 parts by mass, preferably 0.5-5 parts by mass, and more preferably 0.5-2 parts by mass.

In a preferred embodiment of the invention, the polymerization degree of the polysaccharide alcohol is 2-10, preferably 2-8, more preferably 2-6.

In another preferred embodiment of the invention, the polysaccharide alcohol comprises:
A) a polymer formed from a monomer selected from the group consisting of sorbitol, mannitol, erythritol, maltitol, lactitol, xylitol, hydrogenated starch sugar alcohol, isomaltitol, D-mannitol or combinations thereof; preferably a polymer formed from a monomer selected from the group consisting of erythritol, xylitol, sorbitol or combinations thereof; and/or
B) one or more of polysorbitol, polymannitol, polyerythritol, polymaltitol, polylactitol, polyxylitol, poly(hydrogenated starch sugar alcohol), polyisomaltitol, poly(D-mannitol); preferably one or more of polyerythritol, polyxylitol, polysorbitol.

In a more preferred embodiment of the invention, based on the mass of the polysaccharide alcohol, the proportion of the polymeric unit derived from one kind of saccharide alcohol monomer in the polysaccharide alcohol is greater than 80 mass %, preferably greater than 85 mass %, preferably greater than 90 mass %, more preferably greater than 95 mass %, more preferably greater than 99 mass %.

In another preferred embodiment of the invention, the flour in the flour product is selected from the group consisting of wheat flour, rice flour, glutinous rice flour or combinations thereof.

DETAILED DESCRIPTION OF THE INVENTION

A "range" disclosed herein comprises a lower limit and/or an upper limit. It may comprise one or more lower limits and/or one or more upper limits. A given range is defined by selecting one lower limit and one upper limit. The selected lower limit and upper limit define the boundary of a particular range. All ranges that may be defined this way are inclusive and combinable, i.e. any lower limit may be combined with any upper limit to form a range. For example, when ranges of 60-120 and 80-110 are given for a particular parameter, it shall be understood that ranges of 60-110 and 80-120 are also contemplated. In addition, if 1 and 2 are given for the smallest ranges, and 3, 4 and 5 are given for the largest ranges, the following ranges are all contemplated: 1-3, 1-4, 1-5, 2-3, 2-4 and 2-5.

In the invention, the content ranges of the ingredients in a composition and the preferred ranges thereof may be combined with each other to form new technical solutions, unless otherwise specified.

In the invention, the "combination" refers to a multi-component mixture of the various elements, such as a multi-component mixture of two, three, four or even a possible largest number of elements, unless otherwise specified. In particular, when the polysaccharide alcohol is defined herein to be a polymer formed from a combination of monomers selected from a group consisting of sorbitol, mannitol, erythritol, maltitol, lactitol, xylitol, hydrogenated starch sugar alcohol, isomaltitol, D-mannitol, it means a copolymerization product formed by polymerization of a plurality of monomers selected from the above monomers; when the polysaccharide alcohol is defined to comprise a plurality of polymers selected from polysorbitol, polymannitol, polyerythritol, polymaltitol, polylactitol, polyxylitol, poly(hydrogenated starch sugar alcohol), polyisomaltitol, poly(D-mannitol), it means a mixture or a blended polymer of a plurality of homopolymers.

In the invention, all "parts" and percentages (%) are based on weight, unless otherwise specified.

In the invention, the sum of the percentages of all the ingredients of any composition is 100%, unless otherwise specified.

In the invention, a numerical range of "a-b" is a simplified representation of the collection of any real numbers between a and b, wherein both a and b are real numbers, unless otherwise specified. For example, the numerical range of "0-5" is intended to mean that all real numbers between "0-5" are disclosed herein, wherein "0-5" is only a simplified representation of the collection of these numbers.

If not specified particularly, the term "a" as used herein refers to "at least one".

If not specified particularly, the basis for any percentage (including any weight percentage) described in the invention is the total weight of a composition.

In the invention, if not specified particularly, all the embodiments and preferred embodiments mentioned herein may be combined with each other to form new technical solutions.

In the invention, if not specified particularly, all the technical features and preferred features mentioned herein may be combined with each other to form new technical solutions.

In the invention, if not specified particularly, all the steps mentioned herein may be conducted in order or randomly, but preferably in order. For example, when a method comprises steps (a) and (b), it means that this method comprises steps (a) and (b) conducted sequentially, or steps (b) and (a) conducted sequentially. For example, if the method mentioned above further comprises step (c), it means that step (c) may be incorporated into the method in any sequence. For example, the method may comprise steps (a), (b) and (c), or steps (a), (c) and (b), or steps (c), (a) and (b) in consequence, etc.

In the invention, if not specified particularly, the term "comprise" mentioned herein can be either open or closed ended mode. For example, the term "comprise" means that other elements which are not listed can also be included, or that only those elements which are listed are exclusively included.

In the invention, if not specified particularly, the particular numerical values and the particular substances in the Examples herein may be combined with the features in the Detailed Description herein. For example, if the reaction temperature mentioned in the Detailed Description is 10-100° C., and the reaction temperature mentioned in the Examples is 20° C., it shall be recognized that a range of 10-20° C. or 20-100° C. is disclosed specifically herein, and this range can be combined with the other features in the Detailed Description to form new technical solutions. As another example, if a class of alcohol compounds are mentioned in the Detailed Description herein, and ethanol is particularly used in the Examples, ethanol may be combined with the other features in the Detailed Description to form new technical solutions.

Unless otherwise specified, all percentages and proportions in this disclosure are based on mass. In addition, all numerical ranges described herein include endpoint values, and the upper and lower limits of the ranges disclosed may be combined with each other optionally to form new numerical ranges. For example, if the mass percentage of a component is disclosed to be 10-30 mass %, preferably 15-25 mass %, more preferably 20-23 mass %, then the following numerical ranges are disclosed equivalently at the same time: 10-15 mass %, 10-25 mass %, 10-20 mass %, 10-23 mass %, 15-30 mass %, 15-20 mass %, 15-23 mass %, 20-25 mass %, 23-25 mass %.

In the invention, a "saccharide alcohol" refers to a polyol compound obtained by reducing the aldehyde or ketone group on a monosaccharide molecule to an alcohol group, including sorbitol, mannitol, erythritol, maltitol, lactitol, xylitol, hydrogenated starch sugar alcohol, isomaltitol, D-mannitol, etc. These saccharide alcohols may be subjected to condensation polymerization via their hydroxyl groups to obtain polysaccharide alcohols. Taking erythritol as an example, polyerythritol may be formed preferably by polymerization according to the reaction process shown by formula (2):

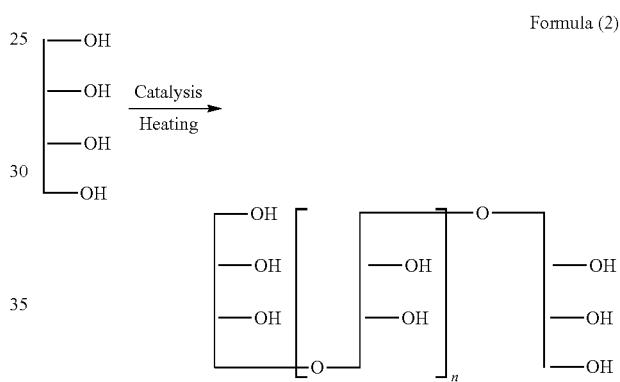

Formula (2)

As can be appreciated by those skilled in the art, though it is the hydroxyl group on #1 position that takes part in the condensation as shown in the above figure, the invention also includes the product obtained by condensation of the hydroxyl group on #2 position.

In the invention, the monomers in a polysaccharide alcohol are linked via ether bond, and the monomers are linked with each other via at least one chemical bond. The polysaccharide alcohol thus formed may have a chain structure or a cyclic structure.

The polysaccharide alcohol used in the invention may be a monopolymer obtained by polymerizing one kind of saccharide alcohol as described above, or a copolymer obtained by copolymerizing two or more kinds of saccharide alcohols mentioned above. The ratios of the various saccharide alcohols in a raw material and the reaction conditions may be selected specifically as desired to obtain a co-polysaccharide alcohol having the desired composition.

In a preferred embodiment of the invention, the polysaccharide alcohol of the invention is principally a polymer formed by polymerizing erythritol monomer. Nevertheless, it may also comprise polymeric units derived from other saccharide alcohols including, for example, sorbitol, mannitol, maltitol, lactitol, xylitol, hydrogenated starch sugar alcohol, isomaltitol, D-mannitol, etc. Based on the mass of the polysaccharide alcohol, the proportion of the polymeric unit derived from erythritol monomer in the polysaccharide alcohol is preferably at least 80 mass %, preferably at least 85 mass %, more preferably at least 90 mass %, more preferably at least 95 mass %, most preferably at least 99 mass %.

In an embodiment of the invention, in order to prepare a polysaccharide alcohol, raw materials of two or more saccharide alcohol monomers are subjected to copolymerization or blended polymerization to obtain a polysaccharide alcohol comprising two or more kinds of saccharide alcohol monomers. In a preferred embodiment of the invention, the polysaccharide alcohol of the invention comprises principally a polymeric unit derived from one kind of saccharide alcohol (e.g. erythritol), and the proportion of other saccharide alcohol unit(s) than the above saccharide alcohol (e.g. erythritol) is relatively small. In a preferred embodiment, based on the mass of the polysaccharide alcohol, the proportion of the polymeric unit(s) derived from other saccharide alcohol monomer(s) than erythritol is less than 20 mass %, preferably less than 10 mass %, more preferably less than 5 mass %, most preferably less than 1 mass %.

In an embodiment of the invention, the polysaccharide alcohol is selected from the group consisting of polysorbitol, polymannitol, polyerythritol, polymaltitol, polylactitol, polyxylitol, poly(hydrogenated starch sugar alcohol), polyisomaltitol, poly(D-mannitol) or blended polymers thereof; preferably polyerythritol, polyxylitol, polysorbitol or blended polymers thereof.

In another preferred embodiment of the invention, a mixture consisting of a plurality of polysaccharide alcohols is used, for example, a mixture consisting of two or more of polysorbitol, polymannitol, polyerythritol, polymaltitol, polylactitol, polyxylitol, poly(hydrogenated starch sugar alcohol), polyisomaltitol, poly(D-mannitol); preferably a mixture consisting of two or three of polyerythritol, polyxylitol, polysorbitol.

In the invention, "a polymeric unit derived from one kind of monomer" refers to a structural unit in a polymer product that is derived from a monomer raw material, wherein the position and number of the group in this structural unit that takes part in the polymerization reaction may vary. For example, the "polymeric unit derived from erythritol monomer" in polyerythritol includes but is not limited to structural units in which the hydroxyl group on #1 position and/or the hydroxyl group on #2 position take part in condensation reaction. In addition, one hydroxyl group, or two or more hydroxyl groups in the structural unit may undergo condensation.

In the invention, the concept of "polymerization degree" is used to characterize the moles of a saccharide alcohol monomer that constitutes one mole of a polysaccharide alcohol. For example, "a polysaccharide alcohol having a polymerization degree of 3" represents a trimeric product formed by polymerizing three polysaccharide alcohol monomers, i.e. the case shown by formula (2) wherein n=1. In an embodiment of the invention, the polymerization degree of the polysaccharide alcohol is 2-10, more preferably 2-8, more preferably 2-6. In another embodiment of the invention, the polymerization degree is 5-6. In another embodiment of the invention, the polymerization degree is 7-8. In another embodiment of the invention, the polymerization degree is 4-5. In another embodiment of the invention, the polymerization degree is 2-3.

In the invention, the term "blended polymer" refers to a substance obtained by blending different kinds of polymeric saccharide alcohols under heating and melting conditions, wherein the polymeric chains formed from different monomers may further link with each other to a certain degree.

In an embodiment of the invention, when the total mass of the flour used to prepare the flour product is taken as 100 parts by mass, the amount of the polysaccharide alcohol polymer used is 0.01-10 parts by mass, 0.1-10 parts by mass, 0.5-10 parts by mass, 1.0-10 parts by mass, 1.0-9 parts by mass, 1.0-8 parts by mass, 1.0-5 parts by mass, 2-10 parts by mass, 2-9 parts by mass, 2-8 parts by mass, 2-5 parts by mass, 5-10 parts by mass, 5-8 parts by mass; preferably 0.1 parts by mass, 0.2 parts by mass, 0.3 parts by mass, 0.4 parts by mass, 0.5 parts by mass, 0.6 parts by mass, 0.7 parts by mass, 0.8 parts by mass, 0.9 parts by mass, 1.0 part by mass, 1.1 parts by mass, 1.2 parts by mass, 1.3 parts by mass, 1.4 parts by mass, 1.5 parts by mass, 1.6 parts by mass, 1.7 parts by mass, 1.8 parts by mass, 1.9 parts by mass, 2.0 parts by mass, 2.1 parts by mass, 2.2 parts by mass, 2.3 parts by mass, 2.4 parts by mass, 2.5 parts by mass, 2.6 parts by mass, 2.7 parts by mass, 2.8 parts by mass, 2.9 parts by mass, 3.0 parts by mass, 3.1 parts by mass, 3.2 parts by mass, 3.3 parts by mass, 3.4 parts by mass, 3.5 parts by mass, 3.6 parts by mass, 3.7 parts by mass, 3.8 parts by mass, 3.9 parts by mass, 4.0 parts by mass, 4.1 parts by mass, 4.2 parts by mass, 4.3 parts by mass, 4.4 parts by mass, 4.5 parts by mass, 4.6 parts by mass, 4.7 parts by mass, 4.8 parts by mass, 4.9 parts by mass, 5.0 parts by mass, 5.1 parts by mass, 5.2 parts by mass, 5.3 parts by mass, 5.4 parts by mass, 5.5 parts by mass, 5.6 parts by mass, 5.7 parts by mass, 5.8 parts by mass, 5.9 parts by mass, 6.0 parts by mass, 6.1 parts by mass, 6.2 parts by mass, 6.3 parts by mass, 6.4 parts by mass, 6.5 parts by mass, 6.6 parts by mass, 6.7 parts by mass, 6.8 parts by mass, 6.9 parts by mass, 7.0 parts by mass, 7.1 parts by mass, 7.2 parts by mass, 7.3 parts by mass, 7.4 parts by mass, 7.5 parts by mass, 7.6 parts by mass, 7.7 parts by mass, 7.8 parts by mass, 7.9 parts by mass, 8.0 parts by mass, 8.1 parts by mass, 8.2 parts by mass, 8.3 parts by mass, 8.4 parts by mass, 8.5 parts by mass, 8.6 parts by mass, 8.7 parts by mass, 8.8 parts by mass, 8.9 parts by mass, 9.0 parts by mass, 9.1 parts by mass, 9.2 parts by mass, 9.3 parts by mass, 9.4 parts by mass, 9.5 parts by mass, 9.6 parts by mass, 9.7 parts by mass, 9.8 parts by mass, 9.9 parts by mass, 10.0 parts by mass.

In an embodiment of the invention, the flour product comprises flour and a whitener as essential ingredients, and optionally comprises water and other additives. In the invention, flour refers to powder obtained by grinding cereal grains as known to those skilled in the art. Hence, "flour" and "powder obtained by grinding cereal grains" may be used interchangeably in the invention. Specifically, non-limiting examples of flour include wheat flour, barley flour, oat flour, rice flour, millet flour, glutinous rice flour or combinations thereof, preferably wheat flour. As can be appreciated by those skilled in the art, the flour may also include starch produced using the above cereal flour as raw material.

In addition to the polysaccharide alcohol of the invention, the whitener in the flour product may also optionally include other whitener ingredients known in the art.

The flour product of the invention may include various flour foods conventionally consumed by people, such as doughs, noodles, steamed buns, bread, pastries, cakes, cookies, steamed buns with stuffing, dumplings, sweet dumplings, various soups containing flour, etc; and may also include other products using flour as one of the raw materials, such as sculptures, molds, paintings, etc. Based on the types of the flour products and the relevant needs of people, in addition to flour and a whitener, the flour product may also optionally include water and other additives, such as foamers, fermentation agents, acidity regulators, anti-caking agents, defoamers, antioxidants, leavening agents, colorants, color fixatives, flavoring agents, nutrition enhancers, preservatives, sweeteners, thickeners, flavors, adhesives, etc.

After reading the above specification, those skilled in the art can modify, substitute and combine the above embodiments to the extent of the scope covered by the art, so as to implement the invention and produce similar technical effects. All these modifications, substitutions and combinations are included within the scope of the invention, too.

Preferred embodiments of the invention will be illustrated in more detail with reference to the following specific examples in order for the invention to be understood more deeply and precisely. Nevertheless, it is to be noted that the following specific examples are only intended for illustration, not for limiting in any way the protection scope of the invention which is defined only by the claims.

EXAMPLES

In the following Examples, the applicant used erythritol, sorbitol and xylitol to prepare various homopolymers, copolymermers and blended polymers of polysaccharide alcohols and used them for flour whitening experimentation. However, it is to be appreciated that other types of polysaccharide alcohols may also be used for the purpose of the invention and achieving similar technical effects, and thus they are also included in the protection scope of the invention.

Preparation Example A. Preparation of Erythritol Homopolymer

Preparation Example A1. Preparation of Erythritol Homopolymer Having a Polymerization Degree of 2-3

500 g erythritol (available from Cargill Co.) was weighed and placed into a three-neck flask equipped with a reflux condenser, a thermometer, a feeding device and connected to a vacuum pump. After the erythritol was melted fully by heating to 130° C., 2% (i.e. 10 g) NaOH was added, and the flask was vacuumized quickly to a pressure of about 35 mmHg. The temperature was increased to 210° C., and the reaction system was agitated and allowed to react at this temperature for 6 hours.

After the reaction was over, the system was cooled to room temperature, and the product was dissolved by adding 450 mL water and discolored with activated carbon and hargil. The activated carbon and hargil were removed by suction filtration on a Buchner funnel, and then the filtrate was purified using an ion-exchange chromatographic column. Moisture was removed by rotary evaporation to give 420 g homopolymer of erythritol. IR spectroscopy of the product characterized using a Shimadzu IR Prestige-21 infrared spectrometer showed that an absorption peak of ether bond appeared at 1050 cm$^{-1}$ in addition to the absorption peak of hydroxyl group at 3400 cm$^{-1}$, verifying the generation of erythritol homopolymer. The molecule weight of the erythritol homopolymer was determined to be 298 using gel permeation chromatography (Waters 2695 GPC), from which it was known that the polymerization degree of this product was about 2.4.

Preparation Example A2. Preparation of Erythritol Homopolymer Having a Polymerization Degree of 5-6

500 g erythritol (available from Cargill Co.) was weighed and placed into a three-neck flask equipped with a reflux condenser, a thermometer, a feeding device and connected to a vacuum pump. After the erythritol was melted fully by heating to 130° C., 2% (i.e. 10 g) K$_2$CO$_3$ was added, and the flask was vacuumized quickly to a pressure of about 35 mmHg. The temperature was increased to 210° C., and the reaction system was agitated and allowed to react at this temperature for 8 hours. Workup and separation were conducted as in the above Preparation Example A1 to obtain 427 g product. IR spectroscopy of the product characterized using a Shimadzu IR Prestige-21 infrared spectrometer showed that an absorption peak of ether bond appeared at 1050 cm$^{-1}$ in addition to the absorption peak of hydroxyl group at 3400 cm$^{-1}$, verifying the generation of erythritol homopolymer. The molecule weight was characterized by GPC to be 620, indicating that the polymerization degree of the product was about 5.1.

Preparation Example A3. Preparation of Erythritol Homopolymer Having a Polymerization Degree of 7-8

500 g erythritol (available from Cargill Co.) was weighed and placed into a three-neck flask equipped with a reflux condenser, a thermometer, a feeding device and connected to a vacuum pump. After the erythritol was melted fully by heating to 130° C., 2% (i.e. 10 g) K$_2$CO$_3$ was added, and the flask was vacuumized quickly to a pressure of about 35 mmHg. The temperature was increased to 210° C., and the reaction system was agitated and allowed to react at this temperature for 10 hours. Workup and separation were conducted as in the above Preparation Example A2 to obtain 432 g product. IR spectroscopy of the product characterized using a Shimadzu IR Prestige-21 infrared spectrometer showed that an absorption peak of ether bond appeared at 1050 cm$^{-1}$ in addition to the absorption peak of hydroxyl group at 3400 cm$^{-1}$, verifying the generation of erythritol homopolymer. The molecule weight was characterized by GPC to be 900, indicating that the polymerization degree of the product was about 7.4.

Preparation Example B. Preparation of Erythritol-Xylitol Copolymer 400 g erythritol (available from Cargill Co.) and 100 g xylitol (available from Cargill Co.) were weighed and placed into a three-neck flask equipped with a reflux condenser, a thermometer, a feeding device and connected to a vacuum pump. After the saccharide alcohols were melted fully by heating to 130° C., 2% (i.e. 10 g) NaOH was added, and the flask was vacuumized quickly to a pressure of about 35 mmHg. The temperature was increased to 210° C., and the reaction system was agitated and allowed to react at this temperature for 7 hours.

After the reaction was over, the system was cooled to room temperature, and the product was dissolved by adding 450 mL water and discolored with activated carbon and hargil. The activated carbon and hargil were removed by suction filtration on a Buchner funnel, and then the filtrate was purified using an ion-exchange chromatographic column. Moisture was removed by rotary evaporation to give 430 g erythritol-xylitol copolymer with a mass ratio of 4:1. IR spectroscopy of the product characterized using a Shimadzu IR Prestige-21 infrared spectrometer showed that an absorption peak of ether bond appeared at 1049 cm$^{-1}$ in addition to the absorption peak of hydroxyl group at 3400 cm$^{-1}$, verifying the generation of erythritol-xylitol copolymer.

Preparation Example C. Preparation of Erythritol-Sorbitol Copolymer 450 g erythritol (available from Cargill Co.) and 50 g sorbitol (available from Cargill Co.) were weighed and placed into a three-neck flask equipped with a reflux condenser, a thermometer, a feeding device and connected to a vacuum pump. After the saccharide alcohols were melted fully by heating to 130° C., 2% (i.e. 10 g) NaOH was added, and the flask was vacuumized quickly to a pressure of about 35 mmHg. The temperature was increased to 210° C., and the reaction system was agitated and allowed to react at this temperature for 7 hours.

After the reaction was over, the system was cooled to room temperature, and the product was dissolved by adding 450 mL water and discolored with activated carbon and hargil. The activated carbon and hargil were removed by suction filtration on a Buchner funnel, and then the filtrate was purified using an ion-exchange chromatographic column. Moisture was removed by rotary evaporation to give 440 g erythritol-sorbitol copolymer with a mass ratio of 9:1.

IR spectroscopy of the product characterized using a Shimadzu IR Prestige-21 infrared spectrometer showed that an absorption peak of ether bond appeared at 1049 $cm^{-1}$ in addition to the absorption peak of hydroxyl group at 3400 $cm^{-1}$, verifying the generation of erythritol-sorbitol copolymer.

Preparation Example D. Preparation of Sorbitol Homopolymer 500 g sorbitol (available from Cargill Co.) was weighed and placed into a three-neck flask equipped with a reflux condenser, a thermometer, a feeding device and connected to a vacuum pump. After the saccharide alcohol was melted fully by heating to 110° C., 2% (i.e. 10 g) NaOH was added, and the flask was vacuumized quickly to a pressure of about 35 mmHg. The temperature was increased to 210° C., and the reaction system was agitated and allowed to react at this temperature for 8 hours.

After the reaction was over, the system was cooled to room temperature, and the product was dissolved by adding 450 mL water and discolored with activated carbon and hargil. The activated carbon and hargil were removed by suction filtration on a Buchner funnel, and then the filtrate was purified using an ion-exchange chromatographic column. Moisture was removed by rotary evaporation to give 450 g sorbitol homopolymer. IR spectroscopy of the product characterized using a Shimadzu IR Prestige-21 infrared spectrometer showed that an absorption peak of ether bond appeared at 1051 $cm^{-1}$ in addition to the absorption peak of hydroxyl group at 3400 $cm^{-1}$, verifying the generation of sorbitol homopolymer. The molecule weight was characterized by GPC to be 550, indicating that the polymerization degree of the product was about 3.2.

Preparation Example E. Preparation of Xylitol Homopolymer 500 g xylitol (available from Cargill Co.) was weighed and placed into a three-neck flask equipped with a reflux condenser, a thermometer, a feeding device and connected to a vacuum pump. After the saccharide alcohol was melted fully by heating to 110° C., 2% (i.e. 10 g) NaOH was added, and the flask was vacuumized quickly to a pressure of about 35 mmHg. The temperature was increased to 210° C., and the reaction system was agitated and allowed to react at this temperature for 7 hours.

After the reaction was over, the system was cooled to room temperature, and the product was dissolved by adding 450 mL water and discolored with activated carbon and hargil. The activated carbon and hargil were removed by suction filtration on a Buchner funnel, and then the filtrate was purified using an ion-exchange chromatographic column. Moisture was removed by rotary evaporation to give 440 g xylitol homopolymer. IR spectroscopy of the product characterized using a Shimadzu IR Prestige-21 infrared spectrometer showed that an absorption peak of ether bond appeared at 1050 $cm^{-1}$ in addition to the absorption peak of hydroxyl group at 3400 $cm^{-1}$, verifying the generation of xylitol homopolymer. The molecule weight was characterized by GPC to be 400, indicating that the polymerization degree of the product was about 3.1.

Preparation Example F. Preparation of a Blended Polymer of Erythritol and Sorbitol 100 g polymers consisting of polyerythritol prepared according to the above Preparation Example A1 and polysorbitol prepared according to the above Preparation Example D at a mass ratio of 60:40, 70:30, 80:20 or 90:10 was weighed and placed into a single-neck flask, followed by melting under heating, agitation and homogeneous blending to obtain a blended polymer for use.

Preparation Example G. Preparation of a Blended Polymer of Erythritol and Xylitol 100 g polymers consisting of polyerythritol prepared according to the above Preparation Example A1 and polyxylitol prepared according to the above Preparation Example E at a mass ratio of 60:40, 70:30, 80:20 or 90:10 was weighed and placed into a single-neck flask, followed by melting under heating, agitation and homogeneous blending to obtain a blended polymer for use.

Preparation Example H. Method of Preparing Flour Products

Three kinds of flour products, i.e. steamed buns, noodles and frozen doughs, were prepared according to the invention. In the preparation, the saccharide alcohol homopolymer, copolymer and blended polymer prepared in the above Preparation Examples were added at the amounts shown in Tables 1-3 below. The flour used below was Arawana wheat flour available from Yihai Kerry Co.; the water was tap water; the yeast was obtained from Angel Yeast Co. under the trade name of Angel low sugar instant active dry yeast; and the baking powder was obtained from Angel Yeast Co. under the trade name of Bakerdream double effect baking powder.

(i) Use of saccharide alcohol homopolymer, copolymer and blended polymer as whiteners in steamed buns:

Steamed buns were prepared according to the following recipe:

| | |
|---|---|
| Flour | 100 parts by mass |
| Water | 45 parts by mass |
| Yeast | 0.8 parts by mass |
| Baking powder | 0.8 parts by mass |
| Whitener | see Table 1 | a. The yeast and the baking powder were dissolved in the water for subsequent use;

b. The flour and the whitener were poured into a mixing bowl, and the aqueous solution of the yeast and the baking powder was added, followed by agitation for 6 minutes;

c. The resulting dough was taken out and sealed with a freezer bag for 10 minute relaxation;

d. The dough was pressed in a noodle press until it was smooth, and cut into small doughs of 100 g per dough, which small doughs were shaped by hand before they were placed in a proofer at 35° C. and 85% humidity for 50 minute proofing;

e. The small doughs were steamed in a steamer for 20 minutes (time counting began when the water boiled); then the fire was turned off; and the lid was removed for cooling to room temperature, followed by sealing the steamed buns as prepared in a plastic seal box for subsequent test.

(ii) Use of saccharide alcohol homopolymer, copolymer and blended polymer as whiteners in noodles:

Noodles were prepared according to the following recipe:

| Flour | 100 parts by mass |
| Water | 33 parts by mass |
| Whitener | see Table 2 | a. The flour, the whitener and the water were added into a mixing bowl, agitated for 4 minutes, and poured into a beaker which was then sealed for 20 minute storage;

b. A rolling pole was used to press the flour into a dough sheet which was then pressed to a thickness of 1.30 mm in a Model YMZD-350 noodle presser available from Guangzhou Xinzhong Machinery Ltd.;

c. After the broken parts at two ends of the dough sheet were discarded, the remaining dough sheet was cut to a length of 25 cm, and then cut in a noodle cutter into noodles which were then placed at a shady, cool and well-ventilated place for subsequent test.

(iii) Use of saccharide alcohol homopolymer, copolymer and blended polymer as whiteners in frozen doughs:

Frozen doughs were prepared according to the following recipe:

| Flour | 100 parts by mass |
| Water | 40 parts by mass |
| Whitener | see Table 3 | a. The flour, the whitener and the water were added into a mixing bowl and agitated for 5 minutes, and the resulting dough was taken out and sealed for 20 minute storage;

b. The dough was pressed in a noodle press until it was smooth, and cut into small doughs of 100 g per dough, which small doughs were shaped into round doughs by hand before they were placed in a freezer at −24° C. and frozen for 24 hours for subsequent test.

(iv) Steamed buns, noodles and frozen doughs were also prepared as control samples using the above steps without the addition of whiteners; and additional steamed buns, noodles and frozen doughs were prepared with the use of benzoyl peroxide as the whitener for comparison with the whitening effect of the whiteners of the invention.

Preparation Example I. Method of Making Rice-Flour Noodles

Rice-flour noodles were prepared according to the invention. In the preparation, the saccharide alcohol homopolymer, copolymer and blended polymer prepared in the above Preparation Examples were added at the amounts shown in Table 4 below. The late long-grain non-glutinous rice used below was Yiwanjia green rice available from Jiangxi Yongkang Industry Ltd.; the modified potato starch was obtained from Beidahuang Potato Industry Group under the trade name of refined potato starch; and the glycerine monostearate was obtained from Guangzhou Jialishi Food Ltd. under the trade name of Haitang D-95 distilled glycerine monostearate.

The rice-flour noodles were prepared according to the following recipe:

| Late long-grain non-glutinous rice | 100 parts by mass |
| Modified potato starch | 10 parts by mass |
| Glycerine monostearate | 0.5 parts by mass |
| Whitener | see Table 4 | a. The rice was washed in a rice washer;

b. The rice thus washed was soaked in water for 2-4 hours;

c. The soaked rice was milled into a slurry using a slurry mill, and screened through a 100 mesh screener at the same time;

d. The filtered rice slurry was contained in a white fabric bag and then dried in a drum centrifuge;

e. The resulting wet flour was scraped out of the fabric bag, scattered in an agitator, and the content of water was adjusted to 40%, followed by addition of the other ingredients according to the recipe and then the system was subjected to homogeneous agitation;

f. The wet rice flour was fed evenly into a double channel noodle extruder wherein it was extruded into a sheet in the first channel and then extruded into transparent thin noodles in the second channel;

g. After extruded from the noodle extruder, the rice-flour noodles were cooled in air to allow the hot gelatinized rice-flour noodles to retrograde sufficiently;

h. The rice-flour noodles were cut to desired size and continued to retrograde during cooling, and the rice-flour noodles stuck together were separated using a machine; after weighing, the rice-flour noodles were put in a shaped box to be delivered to the next procedure;

i. The rice-flour noodles were gelatinized sufficiently at high temperature in a tunnel type continuous cooking machine, and then transferred onto a weblike conveying belt for secondary cooling at room temperature to further set the shape of the rice-flour noodles;

j. The rice-flour noodles were continuously dried in a drier for several hours to reduce the water content to 11%.

Rice-flour noodles were also prepared as control samples using the above steps without the use of whiteners; and additional rice-flour noodles were prepared with the use of benzoyl peroxide as the whitener for comparison with the whitening effect of the whiteners of the invention.

Test Example: Test Results of Whitening Effect

The flour products prepared in the above Examples were subjected to chromaticity test using a Model WSB-VI whiteness meter available from Hangzhou Daji Photoelectronics Ltd. The whiteness was characterized by the measured L values as summarized in Tables 1-4 below. Greater whiteness value means better whitening effect.

TABLE 1

L values for steamed buns

| Storage time of steamed buns | | 0 h | 24 h | 48 h |
|---|---|---|---|---|
| Control | | 85.53 | 85.25 | 84.69 |
| Erythritol amount | 0.5% | 85.43 | 84.21 | 83.54 |
| | 1% | 85.12 | 84.17 | 83.09 |
| | 2% | 84.65 | 83.53 | 82.77 |
| | 5% | 84.23 | 83.11 | 82.04 |
| Erythritol homopolymer (A1) amount | 0.5% | 86.75 | 86.04 | 85.49 |
| | 1% | 86.41 | 86.23 | 85.60 |
| | 2% | 86.78 | 86.71 | 85.89 |
| | 5% | 86.76 | 86.69 | 85.72 |
| Erythritol homopolymer (A2) amount | 0.5% | 86.56 | 85.66 | 85.31 |
| | 1% | 86.24 | 85.37 | 85.19 |
| | 2% | 85.98 | 85.11 | 84.89 |
| Erythritol homopolymer (A3) amount | 0.5% | 86.09 | 85.89 | 85.16 |
| | 1% | 86.03 | 85.64 | 85.12 |
| Erythritol-xylitol copolymer (B) amount | 0.5% | 85.89 | 85.77 | 85.24 |
| | 1% | 86.38 | 85.87 | 85.75 |
| Sorbitol homopolymer (D) amount | 0.5% | 86.14 | 85.90 | 85.67 |
| | 1% | 86.26 | 86.08 | 85.82 |
| Erythritol-sorbitol blended polymer (F, 90:10) amount | 0.5% | 86.02 | 85.83 | 85.56 |
| | 1% | 86.43 | 86.11 | 85.86 |
| Benzoyl peroxide amount | 0.5% | 86.97 | 86.99 | 86.42 |
| | 1% | 87.57 | 87.14 | 86.80 |
| | 2% | 87.34 | 87.18 | 86.58 |
| | 5% | 87.34 | 87.63 | 86.98 |

The percentages in the table refer to the parts by mass of the corresponding whiteners based on 100 parts by mass of the flour. For example, 0.5% represents 0.5 parts by mass, and 5% represents 5 parts by mass. Such representation is also employed in Tables 2-3 below. As can be seen from Table 1, the erythritol homopolymers having various polymerization degrees as prepared according to Preparation Examples A1-A3, when used as whiteners for the flour products at 0.5-5 parts by mass, can increase effectively the whiteness of fresh steamed buns and those steamed buns stored for a period of time, wherein the erythritol homopolymer prepared according to Preparation Example A1 achieves the best effect when used at 2 parts by mass, comparable to the whitening effect of benzoyl peroxide commonly used in the market up to date. The sorbitol homopolymer prepared according to Preparation Example D also exhibits whitening effect. The erythritol-xylitol copolymer prepared according to Preparation Example B and the erythritol-sorbitol (90:10) blended polymer prepared according to Preparation Example F show whitening effect, too. In contrast, monomeric erythritol does not show any whitening effect.

The inventors have found in the practice that sorbitol homopolymer, xylitol homopolymer, mannitol homopolymer, maltitol homopolymer and lactitol homopolymer achieve the same or similar whitening effect as erythritol when they are added into steamed buns respectively. Additionally, when the polyerythritol (A1) is blended with the above homopolymers to obtain blended polymers comprising 50%, 60%, 70%, 80%, 90% by mass of erythritol, the same whitening effect is achieved by adding each of the blended polymers to the steamed buns.

Furthermore, when compolymers obtained by copolymerizing any combinations of erythritol, sorbitol, xylitol, mannitol, maltitol and lactitol respectively are used as whiteners, the same or similar whitening effect can be achieved.

TABLE 2

L values for noodles

| Storage time of noodles | | 0 h | 24 h | 48 h |
|---|---|---|---|---|
| Control | | 86.10 | 76.06 | 71.01 |
| Erythritol amount | 0.5% | 85.26 | 75.21 | 70.34 |
| | 1% | 85.07 | 74.11 | 69.54 |
| | 2% | 84.76 | 73.82 | 68.62 |
| | 5% | 84.22 | 72.61 | 67.55 |
| Erythritol homopolymer (A1) amount | 0.5% | 86.75 | 77.26 | 71.99 |
| | 1% | 86.27 | 76.78 | 71.24 |
| | 2% | 86.93 | 76.50 | 71.56 |
| Erythritol homopolymer (A2) amount | 0.5% | 86.57 | 76.44 | 71.76 |
| | 1% | 86.24 | 76.21 | 71.43 |
| Erythritol homopolymer (A3) amount | 0.5% | 86.43 | 76.11 | 71.45 |
| | 1% | 86.51 | 76.09 | 71.31 |
| Erythritol-sorbitol copolymer (C) amount | 0.5% | 86.34 | 76.79 | 71.21 |
| | 1% | 86.41 | 76.92 | 71.56 |
| Xylitol homopolymer (E) amount | 0.5% | 86.64 | 77.01 | 71.43 |
| | 1% | 86.75 | 77.13 | 71.78 |
| Erythritol-xylitol blended polymer (G, 80:20) amount | 0.5% | 86.37 | 76.55 | 71.32 |
| | 1% | 86.47 | 76.82 | 71.66 |
| Benzoyl peroxide amount | 0.5% | 86.42 | 76.59 | 71.31 |
| | 1% | 86.22 | 77.10 | 71.45 |
| | 2% | 86.84 | 77.36 | 71.69 |
| | 5% | 86.65 | 77.53 | 71.88 |

As can be seen from Table 2, the erythritol homopolymers having various polymerization degrees as prepared according to Preparation Examples A1-A3, when used as whiteners for the flour products at 0.5-2 parts by mass, can effectively increase the whiteness of fresh noodles and those noodles stored for a period of time, wherein the erythritol homopolymer prepared according to Preparation Example A1 achieves the best effect when used at 0.5 parts by mass, remarkably better than the whitening effect of benzoyl peroxide commonly used in the market. The use of the xylitol homopolymer prepared according to Preparation Example E also exhibits whitening effect. The erythritol-sorbitol copolymer prepared according to Preparation Example C and the erythritol-xylitol (80:20) blended polymer prepared according to Preparation Example G show whitening effect, too. In contrast, monomeric erythritol does not show any whitening effect.

The inventors have found in the practice that sorbitol homopolymer, xylitol homopolymer, mannitol homopolymer, maltitol homopolymer and lactitol homopolymer achieve the same or similar whitening effect when they are added into noodles respectively. Additionally, when the polyerythritol (A1) is blended with the above homopolymers to obtain blended polymers comprising 50%, 60%, 70%, 80%, 90% by mass of erythritol, the same whitening effect is achieved by adding each of the blended polymers to the noodles.

Furthermore, the inventors have found that, when compolymers obtained by copolymerizing any combinations of erythritol, sorbitol, xylitol, mannitol, maltitol and lactitol respectively are added into noodles as whiteners, the same or similar whitening effect can be achieved.

TABLE 3

L values for frozen doughs

| Storage time of frozen doughs | | 0 h | 24 h | 48 h |
|---|---|---|---|---|
| Control | | 85.23 | 77.19 | 76.07 |
| Erythritol amount | 0.5% | 84.96 | 76.63 | 75.83 |
| | 1% | 84.66 | 76.12 | 75.49 |
| | 2% | 84.02 | 76.63 | 75.18 |
| | 5% | 83.59 | 76.24 | 74.46 |

TABLE 3-continued

L values for frozen doughs

| Storage time of frozen doughs | | 0 h | 24 h | 48 h |
|---|---|---|---|---|
| Erythritol homopolymer (A1) amount | 0.5% | 85.42 | 77.40 | 76.48 |
| | 1% | 85.88 | 77.63 | 76.94 |
| | 2% | 85.86 | 77.27 | 76.52 |
| | 5% | 85.65 | 77.13 | 76.87 |
| Erythritol homopolymer (A2) amount | 0.5% | 85.31 | 77.39 | 76.33 |
| | 1% | 85.43 | 77.26 | 76.12 |
| | 2% | 85.57 | 77.30 | 76.23 |
| Erythritol homopolymer (A3) amount | 0.5% | 85.42 | 77.22 | 76.14 |
| | 1% | 85.36 | 77.20 | 76.09 |
| Erythritol-xylitol blended polymer (G, 70:30) amount | 0.5% | 85.46 | 77.32 | 76.24 |
| | 1% | 85.57 | 77.41 | 76.35 |
| Erythritol-xylitol blended polymer (G, 90:10) amount | 0.5% | 85.53 | 77.38 | 76.36 |
| | 1% | 85.66 | 77.50 | 76.42 |
| Benzoyl peroxide amount | 0.5% | 86.20 | 77.49 | 77.15 |
| | 1% | 86.09 | 78.08 | 77.50 |
| | 2% | 86.93 | 78.42 | 77.26 |
| | 5% | 87.51 | 78.69 | 77.76 |

As can be seen from Table 3, the erythritol homopolymers having various polymerization degrees as prepared according to Preparation Examples A1-A3, when used as whiteners for the flour products at 0.5-5 parts by mass, can effectively increase the whiteness of fresh frozen doughs and those frozen doughs stored for a period of time, wherein the erythritol homopolymer prepared according to Preparation Example A1 achieves the best effect when used at 1 part by mass, comparable to the whitening effect of benzoyl peroxide commonly used in the market up to date. The erythritol-xylitol (70:30, 90:10) blended polymers prepared according to Preparation Example G show whitening effect, too, wherein the erythritol-xylitol (90:10) blended polymer achieves better effect. In contrast, monomeric erythritol does not show any whitening effect.

The inventors have found in the practice that sorbitol homopolymer, xylitol homopolymer, mannitol homopolymer, maltitol homopolymer and lactitol homopolymer achieve the same or similar whitening effect when they are added into frozen doughs respectively. Additionally, when the polyerythritol (A1) is blended with the above homopolymers to obtain blended polymers comprising 50%, 60%, 70%, 80%, 90% by mass of erythritol, the same whitening effect is achieved by adding each of the blended polymers to the frozen doughs.

Furthermore, the inventors have found that, when copolymers obtained by copolymerizing any combinations of erythritol, sorbitol, xylitol, mannitol, maltitol and lactitol respectively are added into frozen doughs as whiteners, the same or similar whitening effect can be achieved.

TABLE 4

L values for rice-flour noodles

| Storage time of rice-flour noodles | | 0 h | 24 h | 48 h |
|---|---|---|---|---|
| Control | | 88.23 | 88.11 | 88.07 |
| Erythritol amount | 0.5% | 87.86 | 86.55 | 86.43 |
| | 1% | 87.83 | 86.47 | 86.35 |
| | 2% | 87.73 | 86.09 | 86.01 |
| | 5% | 87.51 | 85.98 | 85.83 |
| Erythritol homopolymer (A1) amount | 0.5% | 88.30 | 88.29 | 88.21 |
| | 1% | 88.75 | 88.69 | 88.57 |
| | 2% | 88.42 | 88.55 | 88.47 |
| | 5% | 88.38 | 88.33 | 88.28 |
| Erythritol homopolymer (A2) amount | 0.5% | 88.31 | 88.25 | 88.18 |
| | 1% | 88.35 | 88.22 | 88.10 |
| | 2% | 88.28 | 88.23 | 88.17 |
| Erythritol homopolymer (A3) amount | 0.5% | 88.42 | 88.39 | 88.32 |
| | 1% | 88.47 | 88.42 | 88.36 |
| Erythritol-sorbitol blended polymer (F, 60:40) amount | 0.5% | 88.29 | 88.23 | 88.14 |
| | 1% | 88.35 | 88.27 | 88.22 |
| Erythritol-sorbitol blended polymer (F, 80:20) amount | 0.5% | 88.41 | 88.36 | 88.25 |
| | 1% | 88.56 | 88.48 | 88.34 |
| Benzoyl peroxide amount | 0.5% | 88.63 | 88.59 | 88.45 |
| | 1% | 88.78 | 88.65 | 88.53 |
| | 2% | 88.81 | 88.79 | 88.63 |
| | 5% | 88.92 | 88.86 | 88.74 |

As can be seen from Table 4, the erythritol homopolymers having various polymerization degrees as prepared according to Preparation Examples A1-A3, when used as whiteners for the flour products at 0.5-5 parts by mass, can effectively increase the whiteness of fresh rice-flour noodles and those rice-flour noodles stored for a period of time, wherein the erythritol homopolymer prepared according to Preparation Example A1 achieves the best effect when used at 1 part by mass, comparable to the whitening effect of benzoyl peroxide commonly used in the market up to date. The erythritol-sorbitol (60:40, 80:20) blended polymers prepared according to Preparation Example F show whitening effect, too, wherein the erythritol-sorbitol (80:20) blended polymer achieves better effect. In contrast, monomeric erythritol does not show any whitening effect.

The inventors have found in the practice that sorbitol homopolymer, xylitol homopolymer, mannitol homopolymer, maltitol homopolymer and lactitol homopolymer achieve the same or similar whitening effect when they are added into rice-flour noodles respectively. Additionally, when the polyerythritol (A1) is blended with the above homopolymers to obtain blended polymers comprising 50%, 60%, 70%, 80%, 90% by mass of erythritol, the same whitening effect is achieved by adding each of the blended polymers to the rice-flour noodles.

Furthermore, the inventors have found that, when copolymers obtained by copolymerizing any combinations of erythritol, sorbitol, xylitol, mannitol, maltitol and lactitol respectively are added into rice-flour noodles as whiteners, the same or similar whitening effect can be achieved.

Without wishing to be bound by theory, the applicant believes that the reason why the polysaccharide alcohol of the invention is capable of whitening a flour product is probably that it can improve the gluten network and increase the fineness of the internal microstructure of the dough, such that the dough obtains a better structure and a larger volume. An appropriate volume, increased plumpness and a fine structure provide the dough with smoother skin which will increase light reflectance and visual whiteness to achieve the effect of physical whitening. It is to be noted particularly that a monomer saccharide alcohol exhibits no whitening effect per se. As indicated by the above experimental data, when the erythritol monomer is added into a flour product, it tends to agglomerate and thus make the dough both stiffer and smaller in volume.

What is claimed is:

1. A composition comprising a whitener and a flour, wherein the whitener comprises a polysaccharide alcohol obtained via condensation polymerization of hydroxyl groups of saccharide alcohols or an isolated polysaccharide alcohol;
   wherein the content of the polysaccharide alcohol is 0.5-10 parts by mass of the flour in the composition, based on 100 parts by mass of the flour in the composition; and
   wherein the polysaccharide alcohol comprises: A) a polymer formed from a monomer selected from the group consisting of sorbitol, mannitol, erythritol, maltitol, lactitol, xylitol, hydrogenated starch sugar alcohol, isomaltitol, D-mannitol, and combinations thereof; or B) one or more of polysorbitol, polymannitol, polyerythritol, polymaltitol, polylactitol, polyxylitol, poly(hydrogenated starch sugar alcohol), polyisomaltitol, and poly(D-mannitol).

2. The composition of claim 1, wherein the content of the polysaccharide alcohol is 0.5-5 parts by mass of the flour in the composition, based on 100 parts by mass of the flour in the composition.

3. The composition of claim 1, wherein polymerization degree of the polysaccharide alcohol is 2-10.

4. The composition of claim 1, wherein the polysaccharide alcohol comprises:
   A) a polymer formed from a monomer selected from the group consisting of sorbitol, erythritol, xylitol, and combinations thereof; or
   B) one or more of polysorbitol, polyerythritol, and polyxylitol.

5. The composition of claim 4, wherein, based on the mass of the polysaccharide alcohol, the proportion of the polymeric unit derived from one kind of saccharide alcohol monomer in the polysaccharide alcohol is greater than 80 mass %.

6. A method of using a polysaccharide alcohol obtained via condensation polymerization of hydroxyl groups of saccharide alcohols or an isolated polysaccharide alcohol comprising:
   adding the polysaccharide alcohol into a flour product for whitening the flour product, wherein the flour product comprises flow;
   wherein the content of the polysaccharide alcohol is 0.5-10 parts by mass of the flour in the product, based on 100 parts by mass of the flour in the product; and
   wherein the polysaccharide alcohol comprises: A) a polymer formed from a monomer selected from the group consisting of sorbitol, mannitol, erythritol, maltitol, lactitol, xylitol, hydrogenated starch sugar alcohol, isomaltitol, D-mannitol, and combinations thereof; or B) one or more of polysorbitol, polymannitol, polyerythritol, polymaltitol, polylactitol, polyxylitol, poly(hydrogenated starch sugar alcohol), polyisomaltitol, and poly(D-mannitol).

7. The method of claim 6, wherein the content of the polysaccharide alcohol is 0.5-5 parts by mass, based on 100 parts by mass of the flour in the flour product.

8. The method of claim 6, wherein polymerization degree of the polysaccharide alcohol is 2-10.

9. The method of claim 6, wherein the polysaccharide alcohol comprises:
   A) a polymer formed from a monomer selected from the group consisting of sorbitol, erythritol, xylitol, and combinations thereof; or
   B) one or more of polysorbitol, polyerythritol, and polyxylitol.

10. The method of claim 9, wherein the proportion of the polymeric unit derived from one kind of saccharide alcohol monomer in the polysaccharide alcohol is greater than 80 mass %, based on the mass of the polysaccharide alcohol.

11. The method of claim 6, wherein the flour product further comprises:
   one or more optional ingredients selected from the group consisting of water, foamers, fermentation agents, acidity regulators, anti-caking agents, defoamers, antioxidants, leavening agents, color fixatives, flavoring agents, nutrition enhancers, preservatives, sweeteners, thickeners, flavors, and adhesives; and
   optional whiteners other than polysaccharide alcohols.

12. The method of claim 11, wherein the flour in the flour product is selected from the group consisting of wheat flour, rice flour, glutinous rice flour, and combinations thereof.

13. The method of claim 6, wherein the flour product is selected from the group consisting of doughs, noodles, steamed buns, bread, pastries, cookies, steamed buns with stuffing, dumplings, sweet dumplings, and soup with flour.

14. The method of claim 6, wherein the flour product further comprises a component, wherein the component is:
   (a) one or more ingredients selected from the group consisting of water, foamers, fermentation agents, acidity regulators, anti-caking agents, defoamers, antioxidants, leavening agents, color fixatives, flavoring agents, nutrition enhancers, preservatives, sweeteners, thickeners, flavors, and adhesives;
   (b) whiteners other than polysaccharide alcohols, or
   (c) a combination of the one or more ingredients and the whiteners.

15. The composition of claim 1, wherein the flour is selected from the group consisting of wheat flour, rice flour, glutinous rice flour, and combinations thereof.

16. The composition of claim 1, wherein the composition is a flour product selected from the group consisting of doughs, noodles, steamed buns, bread, pastries, cookies, steamed buns with stuffing, dumplings, sweet dumplings, and soup with flour.

17. The composition of claim 1, wherein the composition further comprises:
   (a) one or more ingredients selected from the group consisting of water, foamers, fermentation agents, acidity regulators, anti-caking agents, defoamers, antioxidants, leavening agents, color fixatives, flavoring agents, nutrition enhancers, preservatives, sweeteners, thickeners, flavors, and adhesives;
   (b) whiteners other than polysaccharide alcohols, or
   (c) a combination of the one or more ingredients and the whiteners.

* * * * *

UNITED STATES PATENT AND TRADEMARK OFFICE
CERTIFICATE OF CORRECTION

PATENT NO. : 10,398,149 B2
APPLICATION NO. : 14/428284
DATED : September 3, 2019
INVENTOR(S) : Yan Zheng et al.

Page 1 of 1

It is certified that error appears in the above-identified patent and that said Letters Patent is hereby corrected as shown below:

In the Claims

Column 19, Line 41:
In Claim 6, please delete "flow" and insert -- flour -- therefor.

Signed and Sealed this
Twelfth Day of November, 2019

Andrei Iancu
*Director of the United States Patent and Trademark Office*